Feb. 15, 1949.　　　　　E. F. KURTZ　　　　2,461,903
THERMOSTATIC CONTROL

Filed June 16, 1945　　　　　　　　　　2 Sheets-Sheet 1

Edward F. Kurtz
Inventor
Haynes and Koenig
Attorneys

Feb. 15, 1949.　　　　　　E. F. KURTZ　　　　　　2,461,903
THERMOSTATIC CONTROL

Filed June 16, 1945　　　　　　　　　　　　　2 Sheets-Sheet 2

Edward F. Kurtz
Inventor
Haynes and Koenig
Attorneys

Patented Feb. 15, 1949

2,461,903

UNITED STATES PATENT OFFICE 2,461,903

THERMOSTATIC CONTROL

Edward F. Kurtz, Attleboro, Mass., assignor to Metals and Controls Corporation, Attleboro, Mass., a corporation of Massachusetts Application June 16, 1945, Serial No. 599,808

18 Claims. (Cl. 175—320)

This invention relates to thermostatic controls and more particularly to snap-acting thermostatic controls.

Among the objects of this invention are the provision of snap-acting thermostatic controls which control with an exceptionally narrow temperature differential; the provision of thermostatic controls which provide a narrow temperature differential without imposing a periodic operation upon the heating or cooling device; the provision of a snap-acting thermostatic control having nearly a zero operating differential which utilizes a thermostatic element having a substantial temperature differential; and, the provision of a thermostatic control of the type indicated which may be easily constructed and is not easily damaged in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a plan partially in section and showing certain parts in perspective, of a control of the present invention;

Figure 1:
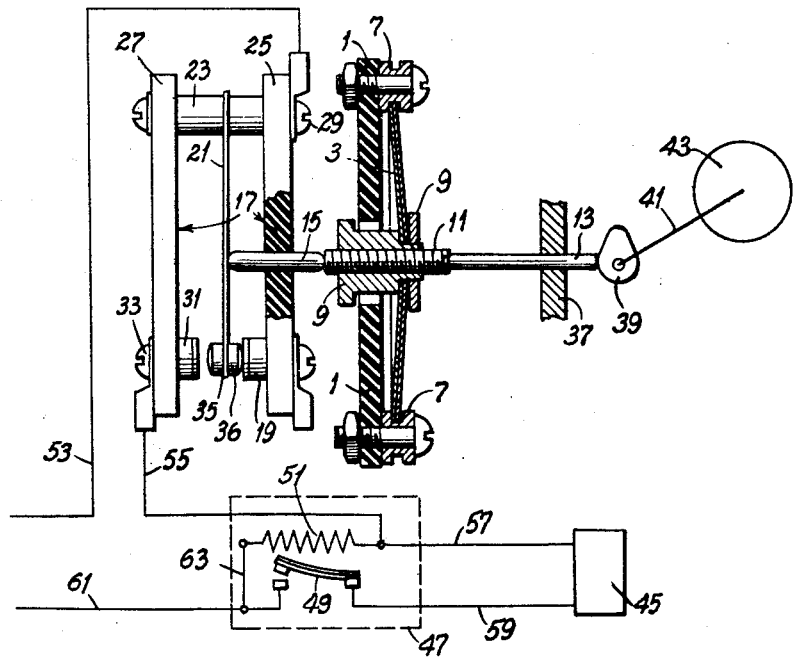
Figure 2:
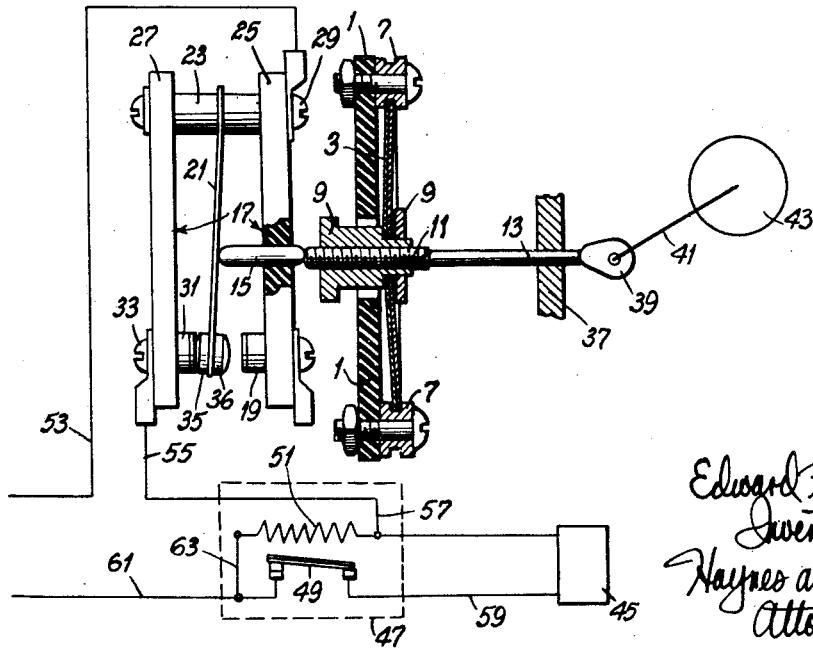
Fig. 2 is a similar view but showing the parts in a different operating position.

Referring now to Figs. 1-2, the thermostatic control includes a thermostatic operating member 1 inherently snap-acting on temperature change, which includes a dished snap-acting thermostatic disc 3. The disc is mounted at its edge by supports 7 and has a central member 9 controlled as to position by the central portion of disc 3.

Member 9 includes a central core 11 against the opposite ends of which bear rods 13 and 15. Rod 15 passes through a base 17 on which is mounted a stop 19 and a switch arm 21. Switch arm 21 is mounted on a pillar 23 which connects the opposite sides 25 and 27 of base 17. A terminal 29 on side 25 is electrically connected to switch arm 21. A contact 31 is mounted on side 27 and is connected to a terminal 33. Switch arm 21 carries at its free end a movable contact 35 located to cooperate with contact 31. A contact 36 on the opposite side of arm 21 cooperates with stop 19. Switch arm 21 is constructed of resilient metal and mounted so that it is biased toward the position shown in Fig. 1. Or it may be constructed of a non-resilient material and biased toward this position in any of the customary ways. Rod 15 abuts switch arm 21.

Rod 13 is supported by the case 37 which houses the control so as to be contacted at its opposite end periodically by a cam 39. Cam 39 is mounted on a shaft 41 rotated by a driving means 43 of any suitable type. A spring driven clock motor or an electric motor are examples of suitable means for 43. It is not necessary that the speed of rotation be constant.

The thermostatic control is connected in a circuit to control a heating or cooling device 45 adapted to heat or cool the medium the temperature of which is to be controlled. A time delay mechanism 47 may also be connected in the circuit. Time delay 47 includes a thermostatic switch 49 and a heater 51 therefor. Power lead 53 is connected to terminal 29. A lead 55 connects terminal 33 and heating or cooling device 45. A lead 57 connects lead 55 to one end of heater 51. A lead 59 connects the heating or cooling device 45 to thermostatic switch 49 which at its other side is connected to power line 61. The other side of heater 51 is also connected to power line 61 by a lead 63.

Assuming that the thermostat is to be used to control a heating device, disc 3 in thermostatic operating member 1 is constructed to assume its Fig. 1 position when hot and its Fig. 2 position when cold. At a temperature within the operating differential it may be in either the Fig. 1 or Fig. 2 position, depending on previous events. This is characteristic of an inherent snap-acting type thermostat. Assuming now that disc 3 is in its Fig. 1 position, as clockwork 43 rotates cam 39 it reaches its Fig. 2 position. This pushes rod 13 which in turn pushes core 11 and rod 15. This moves the control to its Fig. 2 position.

This operation closes a circuit from power line 53 to terminal 29, switch arm 21, contact 35, contact 31, terminal 33, lead 55, lead 57, heater 51, lead 63 and power line 61. Heater 51 thereupon begins to heat thermostatic switch 49. If the temperature of thermostatic member 1 is not above a temperature within its operating differential, disc 3 will remain in its Fig. 2 position and the circuit described will remain closed.

After time delay heater 51 heats thermostatic switch 49 sufficiently to close, in addition to the circuit above described a circuit is established from lead 55 to heating device 45, lead 59, thermostatic switch 49 and power line 61. The heating device thereupon starts to operate and continues to do so until the temperature of thermostatic operating member 1 rises to a temperature above a temperature within the operating differential of disc 3. When this temperature is reached, disc 3 snaps from its Fig. 2 position to its Fig. 1 position, whereupon the resilience of switch arm 21 moves contact 35 away from contact 31, breaking both of the described circuits.

Assume now that when cam 39 rotates to its Fig. 2 position and pushes disc 3 to its Fig. 2 position the temperature of the thermostatic member 1 is higher than a temperature within the operating differential for disc 3. The circuit described above through heater 51 is momentarily closed as described but as soon as cam 39 moves on so that the cam portion no longer pushes rod 13 and the associated mechanism to the Fig. 2 position, disc 3 will snap back to its Fig. 1 position. This permits the resilience of switch arm 21 to separate contacts 35 and 31, breaking the circuit. In this instance it will be noted that the heating device 45 has received no current because the time delay 47 has not had time to heat and close the circuit thereto.

The interval between the mechanical actuations by clockwork 43 through cam 39 can be made as short as proves desirable. The shorter this interval is made the less the temperature will be permitted to vary from the top temperature of the differential of disc 3. As an example, assume that the operating temperatures of disc 3 are "on" at 52° F. and "off" at 72° F. In other words the disc snaps from its Fig. 2 position to its Fig. 1 position at 72° F. and snaps from its Fig. 1 position to its Fig. 2 position at 52° F. If the temperature is at all below 72° F. (even by only a fraction of one degree) when cam 39 mechanically pushes disc 3 to its Fig. 2 position the disc will remain in Fig. 2 position and the heating device 45 will, after a time delay, be actuated.

When the disc 3 then warms to 72° F. it snaps to its Fig. 1 position, breaking the circuit. As long as its temperature remains above 72° F., the mechanical actuation of cam 39 pushes disc 3 to its Fig. 2 position momentarily, but the disc snaps back when the cam portion passes away from rod 13. It will be seen that the temperature is controlled at or close to 72° F. even though the disc 3 would not of itself snap to the Fig. 2 position until the temperature had fallen to 52° F. Thus the operating differential can be made very small although the thermostatic disc 3 has a differential as wide as desired from the point of ease of manufacturing.

Other types of periodic actuation for the thermostitic control may be employed in lieu of clockwork 43 and cam 39.

When the thermostat is used to control a cooling device, disc 3 has its operating temperatures reversed as will be obvious to one skilled in the art.

For example: if during summer it is desired to control the room temperature, by means of a cooling system, at 72° F., the snap-acting thermostat might have temperatures adjusted in it so that it snaps to one position at 72° F., and to the other position at 82° F. Switching means are arranged so that when the disc has cooled to 72° F. the cooling system is stopped by the disc snapping to a position to open the switch means. If, after the disc has warmed slightly, it is pushed in a direction to close the switch and start the cooler, say at 72.5° F., then since the disc temperature is within its adjusted 72°–82° F. temperature differential, it will stay in this switch-closed position until the cooling system lowers its temperature to 72° F., at which point the disc will snap to open the switch again.

If, when a push occurs, the disc is at 71.5° F., for example, it will not stay in the switch-closed position since its temperature is outside its temperature differential range on the switch-open side.

Figure 3:
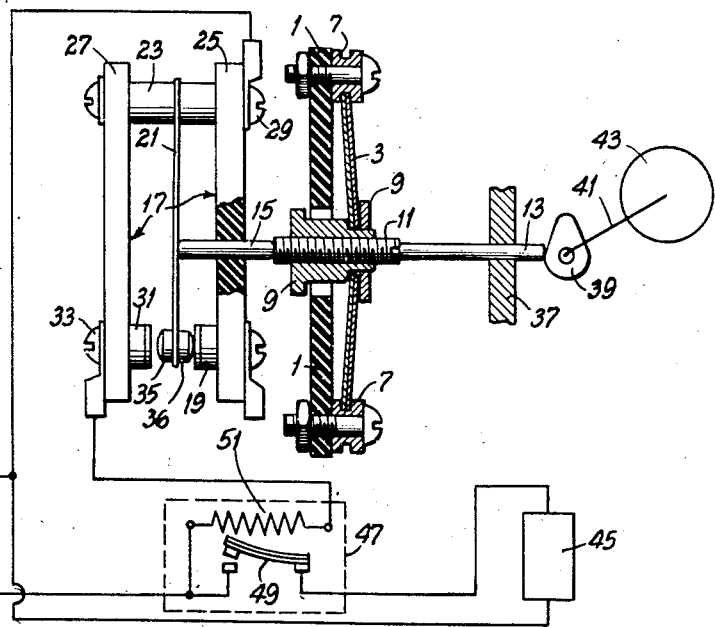
Fig. 3 is a similar view but showing the control in a different circuit.
Figure 4:
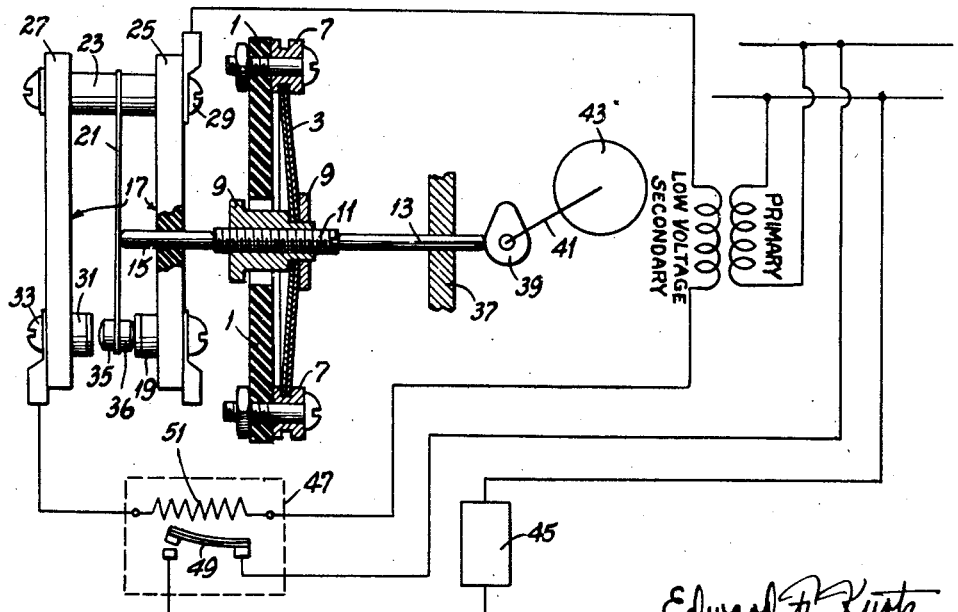
Fig. 4 is a similar view showing the control in still another circuit.

Alternative circuits in which the controls of the present invention may be employed are illustrated in Figs. 3 and 4. In Fig. 3, the control is connected so that it handles only the current of the time-delay mechanism 47 and does not have to handle the heavier current of heating or cooling device 45, while in Fig. 4 the control and heating or cooling device 45 are in separate circuits, which may be of different voltage values, as shown.

The thermostatic controls of the present invention are particularly advantageous for use as room thermostats controlling heating or cooling devices. The manufacturing and snap-acting advantages of a thermostatic control having a wide differential are obtained, yet the finished control has a small operating differential.

Obviously means of adjusting the temperature of operation can be added as for example by biasing a spring against disc 3 and adding a temperature setting dial carrying a numerical or temperature scale as shown in Patent No. 2,239,540 if desired.

In a room thermostat the cam driving means 43 can be the clock motor used for automatically reducing the temperature at night.

In view of the above, it will be seen that the several objects of the invention are achieved and other advantageous results attained.

As many changes could be made in the above construction without departing from the scope of the invention, it is intended that all matter contained in the above description or shown in the accompanying drawings shall be interpreted as illustrative and not in a limiting sense.

I claim:

1. A thermostatic control comprising a stationary contact, a movable contact, an inherently snap-acting temperature responsive device, inherently snap-acting from one position to another on temperature change, located to bring the movable contact against the stationary contact when said device is in one of said positions and to open said contacts when said device snaps to said other position, and mechanical periodically effective means for causing said device to go from said other position to said first position.

2. A thermostatic control comprising a stationary contact, a movable contact, a dished thermostatic disc located to bring the movable contact against the stationary contact when said disc is in one position of curvature, means for mechanically urging said disc periodically toward said one position to close said contacts, and a time delay means operable in response to sustained closure of said contacts for an interval greater than that wherein the contacts are closed by said mechanical means.

3. A thermostatic control comprising a stationary contact, a movable contact, a dished thermostatic disc, means operated by said disc to bring the movable contact against the stationary contact when said disc is in one position of curvature, means for mechanically urging said disc periodically toward said one position to close said contacts, and a thermostatic time delay means operable in response to sustained closure of said contacts for an interval greater than that wherein the contacts are closed by said mechanical means.

4. A thermostatic control comprising a stationary contact, a movable contact, means mounting said movable contact and biased to move said movable contact away from said stationary contact, a snap-acting thermostatic disc located to bring the movable contact against the stationary contact when said disc is in one position of curvature, means for mechanically urging said disc periodically toward said one position to close said contacts, and a thermostatic time delay means operable in response to sustained closure of said contacts for an interval greater than that wherein the contacts are closed by said mechanical means.

5. A thermostatic control comprising a stationary contact, a movable contact, means mounting said movable contact and biased to move said movable contact away from said stationary contact, a thermostatic disc located to bring the movable contact against the stationary contact when said disc is in one position of curvature, a motor mechanically urging said disc periodically toward said one position to close said contacts, and a thermostatic time delay means operable in response to sustained closure of said contacts for an interval greater than that wherein the contacts are closed by said mechanical means.

6. A thermostatic control comprising a stationary contact, a movable contact, means mounting said movable contact and biased to move said movable contact away from said stationary contact, a thermostatic disc located to bring the movable contact against the stationary contact when said disc is in one position of curvature, means for mechanically urging said disc periodically toward said one position to close said contacts, and a thermostatic time delay relay comprising a thermostatic switch under control of a heater, said heater being controlled by said contacts to be energized to actuate said switch in response to sustained closure of said contacts for an interval greater than that wherein the contacts are closed by said mechanical means.

7. A thermostatic control comprising a stationary contact, a movable contact, means mounting said movable contact and biased to move said movable contact away from said stationary contact, a thermostatic disc located to bring the movable contact against the stationary contact when said disc is in one position of curvature, clockwork means for mechanically urging said disc periodically toward said one position to close said contacts, and a thermostatic time delay relay comprising a thermostatic switch under control of a heater, said heater being controlled by said contacts to be energized to actuate said switch in response to sustained closure of said contacts for an interval greater than that wherein the contacts are closed by said mechanical means.

8. A thermostatic control comprising a stationary contact, a movable contact, a snap-acting thermostatic disc, an operating member attached to said disc and located to bring the movable contact against the stationary contact when said disc is in one position of curvature, clockwork means for mechanically urging said disc periodically toward said one position to close said contacts, means biasing said movable contact away from said stationary contact, and a thermostatic time delay relay comprising a thermostatic switch under control of a heater, said heater being controlled by said contacts to be energized to actuate said switch in response to sustained closure of said contacts for an interval greater than that wherein the contacts are closed by said mechanical means.

9. A thermostatic control comprising a base, a stationary contact on said base, a resilient switch arm on said base, a movable contact on said switch arm, a dished snap-acting thermostatic disc, an operating member engaged by said disc to be moved against the switch arm, the contacts being located so that upon such movement of the disc the operating member moves the switch arm and the movable contact to bring the movable contact against the stationary contact, clockwork means, a cam operated by said clockwork means to periodically push said operating member to close said contacts, and a thermostatic time delay relay comprising a thermostatic switch under control of a heater, said heater being controlled by said contacts to be energized to actuate said thermostatic switch in response to sustained closure of said contacts for an interval greater than that wherein the contacts are closed by said clockwork means and cam.

10. A thermostatic control comprising circuit controlling contacts, snap-acting thermostatic means controlling operation of said contacts, said thermostatic means having a range of movement within its operating temperature differential, automatic means for repeatedly moving the thermostatic element through said range of movement periodically to operate said contacts, and time delay control means operable in response to sustained operation of said contacts for an interval greater than that wherein the contacts are operated by said automatic means.

11. A thermostatic control comprising circuit opening and closing contacts, snap-acting thermostatic means controlling closure of the contacts, said thermostatic means having a range of movement within its operating temperature differential, automatic means for repeatedly moving the thermostatic element through said range of movement in a direction toward closing of the contacts periodically to close the contacts, and time delay control means operable in response to sustained closure of said contacts for an interval greater than that wherein the contacts are closed by said automatic means.

12. A thermostatic control comprising contacts adapted to make and break a circuit, an inherently snap-acting temperature-responsive device adapted to snap to one position to close said contacts upon temperature change in one direction and to snap to a second position to open said contacts upon temperature change in the other direction, and means for periodically applying an external force to said device to cause said device to go from said second position to said first position.

13. A thermostatic control comprising contacts adapted to make and break a circuit, a snap-acting thermostatic plate adapted to snap to one position to close said contacts upon temperature change in one direction and to snap to a second position to open said contacts upon temperature change in the other direction, and mechanical means for periodically applying an external force to said device to cause said device to go from said second position to said first position.

14. A thermostatic control for controlling a circuit in response to temperature change, comprising a time delay relay for making and breaking said circuit, means for controlling energization of said relay comprising a set of contacts, an inherently snap-acting temperature-responsive device adapted to snap to one position to close the contacts upon temperature change in one direction and to snap to a second position to open the contacts upon temperature change in the other direction, means for periodically applying an external force to said device to urge it toward its said one position, thereby periodically to initiate operation of said relay, said relay being fully operable to make said circuit only in response to sustained temperature-induced closure of the contacts for an interval greater than that wherein the contacts are periodically closed by said force-applying means.

15. A thermostatic control for controlling a circuit in response to temperature change, comprising a thermostatic time delay relay, said relay comprising a thermostatic switch for making and breaking said circuit and a heater which, when energized for a substantially predetermined interval, causes closure of said switch, and means for controlling energization of said heater comprising a set of contacts, an inherently snap-acting temperature-responsive device adapted to snap to one position to close the contacts and thereby to energize the heater upon temperature change in one direction, and to snap to a second position to open the contacts thereby to deenergize the heater upon temperature change in the other direction, and means for periodically applying an external force to said device to urge it toward its said contact-closing position for an interval less than said predetermined interval.

16. A thermostatic control comprising contacts adapted to make and break a circuit, an inherently snap-acting temperature responsive device having a temperature differential between the temperature at which it snaps from its normal cold position to its hot position upon being heated and the temperature at which it snaps back to its normal position upon cooling, said device being operatively associated with said contacts for closing them when in one of its said positions and for opening them when in the other of its said positions, and means including an intermittently acting member for intermittently applying a force to said device in such manner as to cause it mechanically to snap from said hot position to said cold position.

17. A thermostatic control comprising contacts adapted to make and break a circuit, an inherently snap-acting thermostatic plate having a temperature differential between the temperature at which it snaps from its normal cold position to its hot position upon being heated and the temperature at which it snaps back to its normal cold position upon cooling, said plate being operatively associated with said contacts for closing them when in one of its said positions and for opening them when in the other of its said positions, and mechanism including a periodically actuated force-applying member operatively associated with said plate for periodically applying a force thereto in such manner as to cause the plate mechanically to snap from its position wherein it opens the contacts to its position wherein it closes the contacts.

18. A thermostatic control comprising contacts adapted to make and break a circuit, an inherently snap-acting thermostatic disc having a temperature differential between the temperature at which it snaps from its normal cold position bowed in one direction to its hot position bowed in the opposite direction upon being heated and the temperature at which it snaps back to its normal cold position upon cooling, said disc being operatively associated with said contacts for closing them when in its cold position and for opening them when in its hot position, a force-applying member operatively associated with said disc, and mechanism for periodically actuating said force-applying member periodically to apply a force to said disc in such manner as to cause it mechanically to snap from its hot to its cold position.

EDWARD F. KURTZ.

REFERENCES CITED

The following references are of record in the file of this patent:

UNITED STATES PATENTS

| Number | Name | Date |
|---|---|---|
| 1,448,240 | Spencer | Mar. 13, 1923 |
| 1,908,676 | Appleberg | May 16, 1933 |
| 2,114,184 | Hathaway | Apr. 12, 1938 |
| 2,135,829 | McGoldrick | Nov. 8, 1938 |
| 2,181,606 | Parks | Nov. 28, 1939 |
| 2,298,323 | Wheeler | Oct. 13, 1942 |
| 2,418,762 | Dehn et al. | Apr. 8, 1947 |